Figure 1:
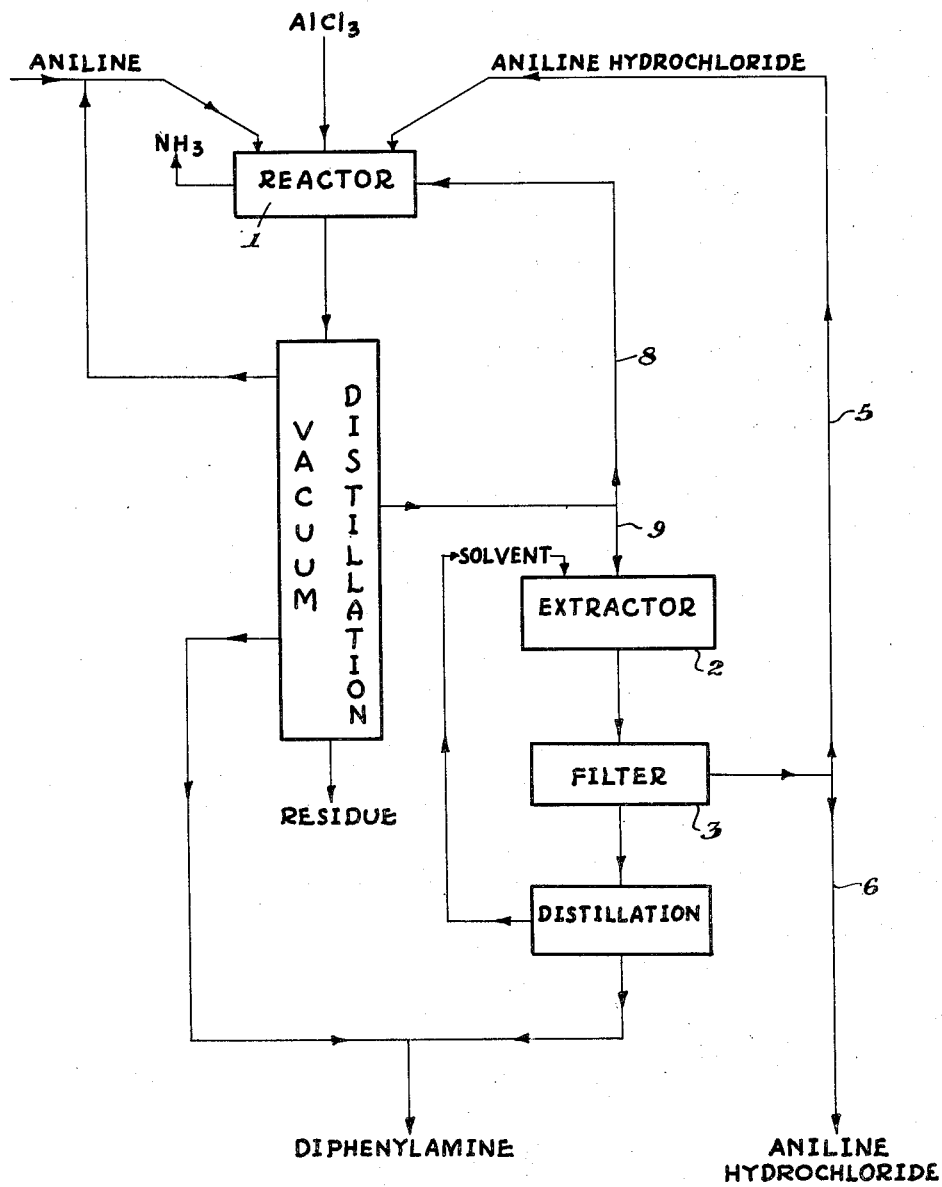

Patented July 11, 1950

2,514,430

UNITED STATES PATENT OFFICE 2,514,430

PRODUCTION OF DIPHENYLAMINE

George Arthur Webb and Robert H. Nimmo, Pittsburgh, Pa., assignors to Koppers Company, Inc., Pittsburgh, Pa., a corporation of Delaware Application March 14, 1947, Serial No. 734,826

8 Claims. (Cl. 260—576)

This invention relates to the manufacture of diphenylamine and is particularly directed to improvements in processes for deammoniating aniline in the presence of an aniline hydrochloride-aluminum chloride catalyst.

It is known that diphenylamine can be produced effectively by deammoniating aniline in the presence of an aniline hydrochloride-metallic chloride catalyst. According to U. S. Patents 2,120,968–9 ferrous chloride, zinc chloride and numerous other metallic chlorides are effective for this purpose. There is no disclosure in these patents, however, of a method for recovering diphenylamine from the reaction product. A. Contardi, La. D. M. (Defenilchloroasina) Giornale Di Chemica Applicata, 1, 11–26 (1920) pages 15–22, however, in deammoniating aniline in the presence of an aniline hydrochloride-zinc chloride catalyst, recovered diphenylamine by fractional distillation under vacuum. The process simply involved distilling off aniline as one fraction, and diphenylamine as another fraction from the residue which included the aniline hydrochloride-zinc chloride catalyst. The double salt of zinc chloride and aniline hydrochloride was sufficiently stable at the temperature of the distillation so that no aniline hydrochloride appeared in the distillate. Bezzubets et al.: Org. Chem. Ind. (USSR) 4, No. 13, 28–30 (1937), (C. A. 31, 8521 (1937)), obtained diphenylamine by refluxing equal parts of aniline and aniline hydrochloride in the presence of aluminum chloride. The reaction mass was poured into ice-water and acidified with HCl. Diphenylamine was filtered off and steam distilled at 270–300° C.

The present invention has for its objects to provide improved processes for the manufacture of diphenylamine by the deammoniation of aniline in the presence of an aniline hydrochloride-aluminum chloride catalyst; to provide improved processes for recovering diphenylamine from the reaction product of such deammoniation processes; to provide processes for effectively separating aniline and diphenylamine in the presence of aniline hydrochloride-aluminum chloride catalyst; to provide processes for recovering aniline hydrocloride in such processes; to prevent cyclic build-up of aniline hydrochloride; to provide effective means for separating mixtures of diphenylamine and aniline hydrochloride; to avoid the disadvantages of the prior art and to obtain advantages as will become apparent. Further objects will appear as the description proceeds.

These objects are accomplished in the present invention which in its broader aspects comprises deammoniating aniline in the presence of an aniline hydrochloride-aluminum chloride catalyst and recovering diphenylamine from the reaction mixture by distillation at a pressure below atmospheric such that the maximum overhead distillation temperature is not greater than about 270° C. We have found that diphenylamine may be distilled from the reaction mixture without undergoing substantial decomposition by maintaining the pressure within the above stated limits during the distillation of diphenylamine. We have found further that aniline may be distilled over under the same conditions or at atmospheric pressure. We have found still further that in the distillation an intermediate fraction is obtained which consists essentially of an heretofore unknown azeotrope of aniline hydrochloride and diphenylamine. Further objects of the invention are accomplished therefore in separating and recycling aniline and in separating diphenylamine and aniline hydrochloride from the azeotrope.

Figure 2:
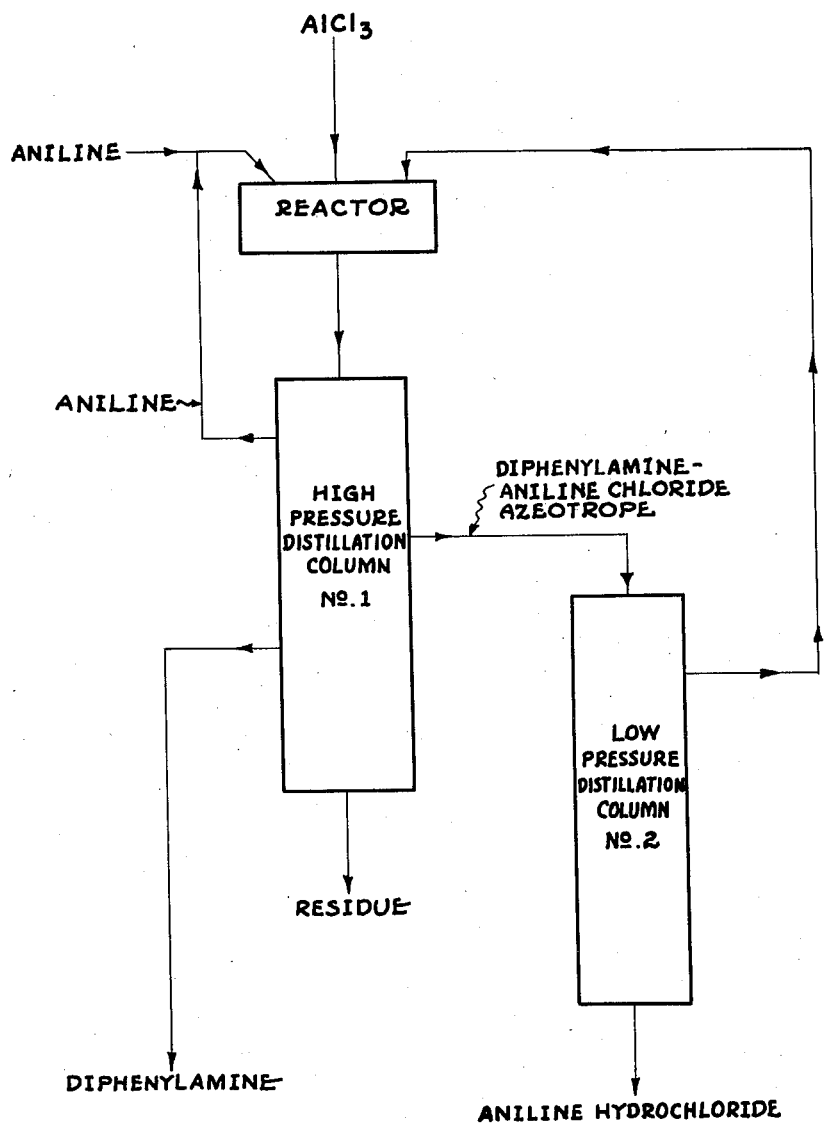

The invention may be more fully understood by reference to the accompanying drawing in which Figure 1 is a flow sheet showing one form of the invention and Figure 2 is a flow sheet illustrating another form. It is to be understood that the representations are purely diagrammatic. Hence, where one fractionating column is shown, it is to be understood that any number may be used as required efficiently to effect the separations indicated.

According to both forms of the invention, aniline, aniline hydrochloride and aluminum chloride in suitable proportions are placed in a simple reactor 1 and maintained at a reactive temperature as required to effect substantial deammoniation of the aniline. There is thus obtained as a product a mixture of aniline, aniline hydrochloride, aluminum chloride and the desired product, diphenylamine. The reaction mixture thus obtained is now subjected to fractionation. Aniline is first stripped off and recycled to the reactor 1. The aniline may be stripped at atmospheric pressure or some lower pressure such as the pressure specified above for distilling diphenylamine. With the distillation pressure suitably regulated to maintain the overhead temperature below the above stated maximum, the fractionation is continued, preferably in a separate column. Diphenylamine is taken off as the highest boiling fraction and the aniline hydrochloride-diphenylamine azeotrope is taken off as an intermediate fraction. The aluminum chloride along with any tar formed in the principal reaction or in the distillation remains as residue of the still.

The aniline hydrochloride-diphenylamine azeotrope may be recycled to the reactor to furnish the required aniline hydrochloride for the catalyst or it may be further treated to separate aniline hydrochloride and diphenylamine in which case aniline hydrochloride may be recycled as such. If desired, the distillation may be so regulated that aniline hydrochloride-diphenylamine azeotrope distills over in the aniline fraction and is thus recycled. In any event, it is desirable to treat at least a portion of the aniline hydrochloride-diphenylamine azeotrope to recover aniline hydrochloride, because in the course of the reaction and/or the distillation aniline hydrochloride is formed in excess of that which is ordinarily introduced into the reactor. Consequently, at least that portion of the intermediate fraction representing the aniline hydrochloride produced should be treated for the recovery of this aniline hydrochloride and the diphenylamine which accompanies it as an azeotrope.

Separation of the aniline hydrochloride-diphenylamine azeotrope is readily effected in a number of ways as, for example, by solvent extraction, azeotropic distillation, fractional crystalization and like processes. Two suitable methods are illustrated in the drawing.

In Figure 1 where is illustrated a method involving the solvent extraction of diphenylamine. Since diphenylamine is organophilic and aniline hydrochloride is hydrophilic the diphenylamine may be very easily extracted preferentially by means of almost any organic solvent for diphenylamine, especially those of the non-polar or relatively non-polar type. The term "solvent" is used herein to mean "A liquid which dissolves another liquid (solute) generally a solid, without any change in chemical composition; as, sugar or salt in water." Hackh Chemical Dictionary, third edition, page 788.

In a special case aniline itself may be used as the solvent for the extraction. It is suitable to employ hydrocarbon solvents such as the petroleum fractions, benzene, etc. Preferably, the solvent should have a boiling point above the melting point of diphenylamine (60° C.) since the efficiency of the extraction is promoted if it is carried at a temperature above the melting point of diphenylamine. Likewise, a higher boiling solvent, i. e., one boiling above 60° C. may be readily condensed in atmospheric pressure condensers, thus facilitating solvent recovery. Preferably, the boiling point of the solvent should not be much over 100° C., say, not more than about 115° C. Within this temperature range the solvent may be recovered without difficulty in atmospheric pressure distillation. With higher boiling solvents such as aniline it is desirable to effect the solvent recovery under reduced pressures.

The aniline hydrochloride - diphenylamine azeotrope with or without previous grinding, according to the nature of the extraction, is extracted with the solvent in extractor 2 along with a suitable amount of solvent. There the azeotropic mixture is extracted as required to take up substantially all of its diphenylamine. Aniline hydrochloride is filtered off by filter 3 and the filtrate is passed on to distillation 4 in which the solvent is recovered and recycled to extractor 2. Diphenylamine is recovered as the residue of distillation 4. The filter cake consists essentially of aniline hydrochloride but may contain diphenylamine according to the efficacy of the extraction. Part is recycled through line 5, if desired, to the reactor 1 and the balance is taken off as product through line 6. The product aniline hydrochloride may, of course, be further purified if necessary or desirable on account of any diphenylamine it may contain.

In the operation of the process as illustrated in Figure 1 the bulk of the intermediate fraction may be recycled through line 8 to reactor 1, and only so much of it drawn off to line 9 to the extractor as required to prevent cyclic build up of aniline hydrochloride in the process. When the relative flows in lines 8 and 9 is properly adjusted there will be no need to recycle any aniline hydrochloride through line 5 because the requisite amount of aniline hydrochloride will be returned through line 8. The diphenylamine also recycled in this manner is not adversely affected in the reactor or the vacuum distillation except as there might be some decomposition in the formation of tar. If the reaction is properly carried out as will be set forth in greater detail hereinafter, however, the loss of diphenylamine due to this recycling is of little, if any, consequence in the process.

In accordance with the form of invention illustrated in Figure 2, the reaction product is fractionated as already described. The intermediate fraction taken off from distillation column No. 1 is then subjected to distillation in column No. 2 at a somewhat lower pressure than that used in column No. 1. This changes the azeotropic composition sufficiently so that a new azeotrope may be distilled off leaving the excess aniline hydrochloride as residue. In the distillation column No. 2 aniline hydrochloride is taken off as bottoms and the new azeotrope composition of aniline hydrochloride-diphenylamine is taken overhead. This overhead is recycled through line 10 to the reactor. By properly regulating the pressure differential between the No. 1 and No. 2 columns the amount of aniline hydrochloride which is taken off as bottoms may be regulated to equal the amount of aniline hydrochloride produced in the reaction and/or distillation. Thus, it is possible in accordance with this procedure to regulate the amount of aniline hydrochloride recycled to the reactor simply by regulating the pressure on the distillation column No. 2. If desired, the overhead from distillation column No. 2 may be recycled to distillation column No. 1. In such case, all the aniline hydrochloride will appear as bottoms of column No. 2 from which the required aniline hydrochloride may be recycled to the reactor 1.

It will be observed in either case that diphenylamine is recycled in the process and again comes in contact with the aluminum chloride either in the reactor 1 or distillation column No. 1. If desired, this may be avoided by use of a third distillation column. The overhead of column No. 2 provides the feed for the additional column and the pressure is maintained at a higher pressure than that used in column No. 2. The pressure may be even higher than that used in distillation column No. 1 because there is no aluminum chloride present. It may be desirable for example to conduct distillation in the added column at atmospheric pressure, or even higher, just as long as the decomposition temperatures of aniline hydrochloride and diphenylamine are not exceeded. In the added distillation column a new azeotropic mixture will be taken overhead and diphenylamine will remain as residue. This overhead may be recycled in the process either to the reactor 1 or as feed for distillation column No. 2.

While in the broader aspects of the invention the deammoniation reaction may be carried out in any suitable manner; for example, as described in Bezzubets et al., supra, it is desirable in the interest of greater efficiency to carry out the deammoniation under particular conditions, as will be described, which minimize the amount of aniline hydrochloride which need be recycled per unit of aniline introduced into the reaction. It is characteristic of atmospheric processes such as are described by Bezzubets et al. that a high proportion of catalyst per unit quantity of aniline is required. Bezzubets et al., for example, used equal parts of aniline and aniline hydrochloride. Under such conditions it is readily conceivable that the amount of diphenylamine formed in proportion to the aniline hydrochloride present could be so small that there would be no diphenylamine fraction in the distillation at all and there might even be an aniline hydrochloride fraction in lieu thereof; that is, of course, until the diphenylamine content had been built up to a suitable level by recycling of diphenylamine in the aniline hydrochloride-diphenylamine azeotrope. It is desirable therefore to operate under conditions such that the amount of aniline hydrochloride is at a minimum.

In accordance with a preferred aspect of the invention we operate the deammoniation at a pressure above atmospheric sufficient to maintain the temperature between 275° C. and about 350° C. Desirably, this temperature is maintained by maintaining a gentle reflux of aniline over the liquid reaction mixture. The ammonia liberated in the deammoniation, for example, may be released from the reactor as required to keep a gentle reflux of aniline over the reaction mixture. A suitable pressure vessel provided with a suitable reflux condenser will be required. At the same time it is desired to maintain the aniline hydrochloride to aluminum chloride in the proportions of at least 3 moles of aniline hydrochloride per mole of aluminum chloride. A mole ratio of 3 to 1 is suitable. Apparently 1 mole of aluminum chloride combines with 3 moles of aniline hydrochloride to form the active catalytic complex and any excess of aluminum chloride over this is not only inactive in producing the desired reaction, but tends to bring about the formation of tar and other undesirable by-products. When the reaction is carried out under these conditions it is possible to maintain a ratio of aniline to aniline hydrochloride as high as 13 to 1 or more as compared to 1 to 1 ratio of the prior art. It will be seen therefore that entirely apart from any diphenylamine recycled in the process as an aniline hydrochloride-diphenylamine azeotrope, the reaction mixture will contain diphenylamine far in excess of the azeotropic composition so that on the first distillation the bulk of the product diphenylamine will be recovered as such. Thus under the preferred conditions for the deammoniation the liquid reaction mixture is maintained under a pressure above atmospheric sufficient to maintain the temperature between about 275° C. and about 350° C. The catalyst ratio is at least 3 moles of aniline hydrochloride for each mole of aluminum chloride, and the reagent proportions is from about 5 to about 15 parts of aniline to each part of aniline hydrochloride.

The invention may be more fully understood by reference to the following examples illustrating typical material balances in which the parts are by weight unless otherwise specified.

Example 1

9,310 parts of aniline consisting of 5,320 parts of make-up aniline and 3,990 parts of aniline recycled from fractional distillation of the reaction mixture are combined with 333 parts of aluminum chloride, 971 parts of aniline hydrochloride and 937 parts of diphenylamine. The last two constitute an azeotropic mixture obtained as the intermediate fraction of the fractional distillation. The reaction mixture thus obtained is heated for five hours under a gentle reflux of aniline while maintaining the temperature of 300° C. by periodic release of ammonia. Over the reaction period, 425 lbs. of ammonia is recovered. The reaction mixture is now subjected to fractional distillation at 350 mm. mercury pressure. The first fraction boiling essentially at 155–155.5° C. consists essentially of aniline; 399 parts of aniline is thus recovered and recycled in the process. The intermediate fraction boils essentially at 215° C. It consists essentially of a constant boiling mixture of aniline hydrochloride and diphenylamine in the proportions of about 50.9% aniline hydrochloride and 49.1% diphenylamine. 2,126 parts of the intermediate fraction are taken overhead, of which 1,908 parts are recycled in the reaction to provide the requisite 971 parts of aniline hydrochloride. The remaining 218 parts is taken to storage. The third fraction boiling essentially at 265° C. consists essentially of diphenylamine. 3,426 parts are thus taken overhead. There remains in the still 1,740 parts residue.

Periodically the accumulated excess aniline hydrochloride-diphenylamine azeotrope is treated to separate the diphenylamine and aniline hydrochloride. Suitably it is ground, extracted with benzene in the proportion of, say, 200 parts of benzene for each 218 parts of azeotrope and filtered. After distilling off the benzene there is recovered aniline hydrochloride and diphenylamine in the proportions of 111 parts of aniline hydrochloride for every 107 parts of diphenylamine. In place of benzene there may be substituted other solvents for diphenylamine including toluene, pyridine, cyclohexane and carbon tetrachloride. The proportion of solvent to diphenylamine is not critical but is determined principally by the solubility of diphenylamine in the solvent.

Example 2

9,310 parts of aniline consisting of 5,320 parts of make-up aniline and 3,990 parts of recycled aniline are introduced into a suitable reactor along with 333 parts of aluminum chloride, 971 parts of aniline hydrochloride and 1,440 parts of diphenylamine. The latter two are comprised in the recycled aniline hydrochloride-diphenylamine azeotrope. The reaction is now conducted as described in Example 1 and the reaction product subjected to vacuum distillation as therein described. In this vacuum distillation, which is conducted at 350 mm. mercury pressure, there is recovered 3,990 parts of aniline which is recycled, 3,533 parts of diphenylamine as product, and 2,126 parts of aniline hydrochloride-diphenylamine azeotrope. The latter is now subjected to vacuum distillation at about 250 mm. mercury pressure whereupon 111 parts of aniline hydrochloride are recovered. The overhead is recycled in the process to provide the 971 parts of aniline hydrochloride required.

The pressure maintained during the distillation may be varied with considerable latitude and different pressures may be used, if desired, in the several distillations. Thus, aniline may be taken over at one pressure, the azeotrope at another and the diphenylamine at still another. In practice, however, it may be more convenient to separate the three fractions at the same pressure. The pressure during the distillation of diphenylamine preferably does not exceed about 400 mm. mercury. At this pressure diphenylamine may be taken overhead at about 270° C. The pressure should be so regulated that this temperature is not exceeded though considerable latitude is permissible. Hence while, strictly speaking, it is the pot or bottom temperature which needs to be watched, it is generally sufficient for our purposes to observe the overhead temperature. In the type of stills required for separating effectively the three fractions, the pressure drop in the column is not sufficient, considering the slope of the distillation curve at the involved temperature and pressure, to make the temperature differential material. Too great a temperature should be avoided, however, as otherwise, decomposition in the distillation may be excessive. Any lower pressure may be used, though at pressures below about 100 mm. mercury complications may arise due to the formation of solids in the distillation. Aniline hydrochloride, for example, has a melting point of 198° C. It is better, therefore, if the pressure is kept above about 200 mm. mercury with the range of 200–400 mm. mercury.

While we have described our invention with reference to particular embodiment thereof, it is to be understood that variation may be made therein without departing from the spirit and scope of the invention as described and as set forth in the appended claims.

We claim:

1. In a process for the manufacture of diphenylamine by the deammoniation of aniline the steps of deammoniating aniline by the action of an aniline hydrochloride-aluminum chloride catalyst to form diphenylamine, subjecting the reaction mixture to distillation and recovering thereby an aniline fraction and an aniline hydrochloride-diphenylamine fraction, separately recovering diphenylamine and aniline hydrochloride from at least that part of said aniline hydrochloride-diphenylamine fraction equivalent to the aniline hydrochloride made in the process, recycling the aniline fraction and enough aniline hydrochloride for further deammoniation of aniline in the presence of an aniline hydrochloride-aluminum chloride catalyst and recovering diphenylamine as product, said distillation being carried out under conditions of pressure such that the maximum overhead temperature is less than 270° C. whereby decomposition of diphenylamine by the catalyst residue is substantially avoided.

2. The method of claim 1 in which the aniline hydrochloride is recycled without separating it from diphenylamine the amount of aniline hydrochloride-diphenylamine fraction thus recycled being sufficient to provide the required aniline hydrochloride in the further deammoniation.

3. The method of claim 1 in which the deammoniation is effected with a catalyst containing at least 3 mols of aniline hydrochloride for each mol of aluminum chloride and in the proportions of between about 5 and about 15 parts of aniline for each part of aniline hydrochloride while maintaining a temperature between about 275° C. and 350° C. by suitable regulation of the autogenous pressure of the reaction whereby in the subsequent distillation the aniline hydrochloride-diphenylamine fraction is relatively small as compared with the diphenylamine fraction.

4. The method of claim 3 in which the pressure during the distillation of at least the diphenylamine-containing fractions is maintained between about 200 and about 400 mm. mercury.

5. The process of claim 1 in which the pressure during the distillation of at least the diphenylamine-containing fractions is maintained between about 200 and 400 mm. mercury.

6. In the manufacture of diphenylamine by the deammoniation of aniline, the steps of subjecting aniline to the action of an aniline hydrochloride-aluminum chloride catalyst containing at least 3 moles of aniline hydrochloride for each mole of aluminum chloride in the proportions of between about 5 and about 15 parts of aniline for each part of aniline hydrochloride while maintaining a temperature between about 275° C. and 350° C. by suitable regulation of the autogenous pressure of the reaction, distilling off aniline from the reaction mixture and returning it to the deammoniation, distilling off an intermediate fraction consisting essentially of an azeotropic mixture of aniline hydrochloride diphenylamine from the remainder, returning a portion of the azeotropic mixture to the deammoniation to supply at least a portion of the aniline hydrochloride required for the deammoniation and extracting the balance of the azeotropic mixture with a diphenylamine solvent, filtering off undissolved aniline hydrochloride and distilling off solvent and returning the recovered solvent to the extractor whereby diphenylamine is obtained as residue of the distillation and distilling diphenylamine from the remainder while maintaining a pressure such that the maximum overhead temperature in the distillations is not greater than about 270° C.

7. The process of claim 1 in which the aniline hydrochloride-diphenylamine fraction is separated into diphenylamine and aniline hydrochloride by extracting it with a solvent for diphenylamine, filtering off the undissolved aniline hydrochloride, distilling solvent from the thus obtained diphenylamine solution and recycling said solvent for further extraction.

8. The process of claim 1 in which the aniline hydrochloride-diphenylamine fraction is separated into diphenylamine and aniline hydrochloride by further distillation at different pressures.

GEORGE ARTHUR WEBB.
ROBERT H. NIMMO.

REFERENCES CITED

The following references are of record in the file of this patent:

UNITED STATES PATENTS

| Number | Name | Date |
| --- | --- | --- |
| 2,120,968 | Acken | June 21, 1938 |
| 2,120,969 | Acken | June 21, 1938 |

FOREIGN PATENTS

| Number | Country | Date |
| --- | --- | --- |
| 1,093 | Great Britain | A. D. 1866 |

OTHER REFERENCES

Contardi: "Giorn. Chim. Ind. Applicata," vol. 2, pp. 100–111 (1920).

Bezzubets et al.: "Chem. Ab.," vol. 31, p. 8521 (1937).